United States Patent
Menlove et al.

(10) Patent No.: US 6,426,504 B1
(45) Date of Patent: Jul. 30, 2002

(54) GAMMA RESISTANT DUAL RANGE NEUTRON DETECTORS

(75) Inventors: Howard O. Menlove, Los Alamos, NM (US); Nathan H. Johnson, Garfield Heights, OH (US); David H. Beddingfield, Jemez Springs, NM (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/418,997

(22) Filed: Oct. 14, 1999

Related U.S. Application Data

(60) Provisional application No. 60/104,231, filed on Oct. 14, 1998.

(51) Int. Cl.$^7$ .................................................. G01T 3/00
(52) U.S. Cl. .................................................. 250/390.01
(58) Field of Search ........................ 250/390.01, 358.1, 250/374

(56) References Cited

U.S. PATENT DOCUMENTS

| | | | | |
|---|---|---|---|---|
| 3,956,654 A | * | 5/1976 | Gleason ........................ | 313/61 |
| 4,121,106 A | * | 10/1978 | Terhune et al. ......... | 250/390.01 |
| 4,393,307 A | * | 7/1983 | Nozaki et al. .............. | 250/390 |
| 4,476,391 A | * | 10/1984 | Bednarczyk ................ | 250/390 |
| 4,634,568 A | * | 1/1987 | Wimpee et al. ............. | 376/154 |
| 5,002,720 A | * | 3/1991 | Berggren ............... | 250/390.01 |
| 5,180,917 A | * | 1/1993 | Wraight .................. | 250/390.01 |
| 5,399,863 A | * | 3/1995 | Carron et al. .......... | 250/390.01 |
| 5,726,453 A | * | 3/1998 | Lott et al. .............. | 250/390.01 |
| 5,973,328 A | * | 10/1999 | Hiller et al. ........... | 250/390.01 |

* cited by examiner

Primary Examiner—Scott J. Sugarman
Assistant Examiner—Mohammed Hasan
(74) Attorney, Agent, or Firm—Nixon & Vanderhye

(57) ABSTRACT

Dual range neutron detector comprising a chamber, an insulator at either end of the chamber, an anode located within the chamber and supported by the insulators, and an electrical connector mounted on one of the insulators for transmission of a signal collected by the anode. The chamber is filled with $^3$He and an inner wall of the chamber which serves as the cathode is provided with a thin boron coating.

7 Claims, 7 Drawing Sheets

GAMMA RESISTANT DUAL RANGE NEUTRON DETECTORS

This application claims the benefit of provisional application 60/104,231 filed Oct. 14, 1998.

FIELD OF THE INVENTION

This invention relates generally to radiation detectors. More particularly, the application relates to a dual range neutron detection device.

BACKGROUND OF THE INVENTION

It is necessary for detection of transitions from low neutron fields to high neutron fields to use two separate detectors, namely a $^3$He detector and a boron-lined detector. For low level neutron fluxes, the high efficiency from $^3$He gives an optimal performance. However, for high levels of neutron fluxes, the $^3$He reaction is too sensitive, making the $^3$He detector unusable. In such instances, a less efficient $^{10}$B proportional counter may be employed. In practice, this means that either two detectors must be employed in the system or one type of detector must be removed and replaced by the other type of detector. This is inconvenient and time-consuming, and sometimes is not possible if space is limited.

In some situations, assay of nuclear materials requires measurements of low levels of neutrons in a high gamma environment. The $^3$He neutron proportional counter is a high sensitivity detector which may be used for low level neutron measurements. However, this detector has a high enough sensitivity to gamma radiation in these applications to make it virtually unusable. The primary cause of gamma response in detectors is the interaction of gamma rays with the construction materials of the detectors. The unique construction of this detector reduces the response to gamma radiation, allowing it to b used in high gamma environments.

A need exists therefore for a single detector which incorporates the features of both designs and is capable of performing both functions. This would avoid the need to install each of the different types of detectors for the particular application, or remove one detector from a system and replace it with the other. A single detector would be advantageous where space limitations prevent the use of two detectors or changing detectors is difficult and/or impractical. The present invention seeks to satisfy that need.

SUMMARY OF THE INVENTION

According to one aspect, there is provided a dual range neutron detector, comprising a chamber which serves as a cathode, an insulator at either end of the chamber, an anode located within the chamber and supported by the insulators, and an electrical connector mounted on one of the insulators for transmission of a signal collected by the anode. The chamber is filled with $^3$He and an inner wall of the chamber is provided with a boron coating.

According to another aspect, there is provided a method of measuring neutron levels in nuclear fuel, which includes providing a dual range neutron detector as defined above proximate the nuclear fuel to be measured, and detecting the neutron level in the fuel. Typically, fuel is spent nuclear fuel.

DETAILED DESCRIPTION OF PREFERRED EMBODIMENTS

Figure 1:
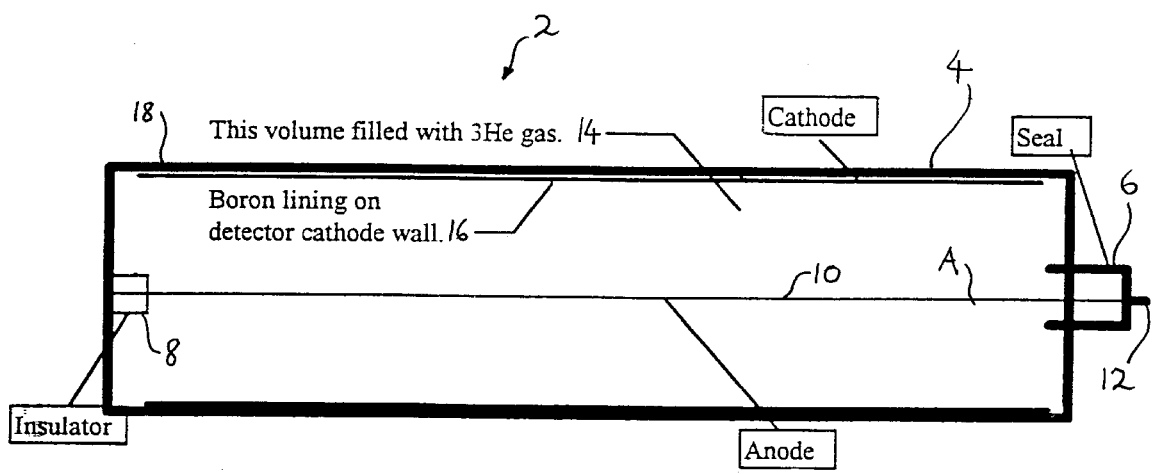
FIG. 1 is a schematic showing a side elevation of a detector of the invention.

Referring to FIG. 1, there is shown a dual range neutron detector of the invention, generally referenced 2. The detector comprises a hermetically sealed chamber 4 which acts as the cathode with a seal 6 and at least one insulator 8 at one end of the chamber 4. An anode 10 in the form of a wire is suspended within the chamber along the central longitudinal axis A of the chamber between the seal 6 and the insulator 8. An external electrical connector 12 is provided at one end of the chamber for transmission of a signal collected by the anode 10.

The chamber contains two sensitive materials, namely $^3$He gas 14 and a thin coating 16 of boron containing $^{10}$B on the wall 18 of the chamber. The $^3$He is normally present in the chamber at a pressure ranging from 0.1 atmosphere up to 20 atmospheres. In some instances pressures greater than 20 atmospheres may be employed.

The boron coating is typically measured by mass of boron per surface area (density). Typical coating densities can range from 0.01 mg/cm$^2$ to 1.0 mg/cm$^2$. The boron coating is applied by painting onto the cathode surface, or by flame spraying the material onto the surface. To paint the boron onto the surface, a binder is first applied to the boron which is then suspended in a liquid carrier. A typical binder is that supplied by Accheson Colloids. The painting and flame spraying techniques are known to persons of ordinary skill in the art.

The chamber is typically fabricated from aluminum or stainless steel. Examples of other materials which may be used are metals such as nickel, copper, brass and titanium. The chamber may be of any suitable cross-section, but is typically cylindrical, with the cathode as the outer shell and the signal collecting anode suspended in the center with insulators. The dimensions of the cylinder typically range from 0.25 inches in diameter to 6 inches in diameter, or larger. The length of the detector may range from about 2.5 inches up to 80 inches or more.

When the detector is used for dual range operation, and/or to minimize the gamma response, the boron coating is typically enriched to greater than about 90% of the $^{10}$B isotope, more usually greater than about 92% $^{10}$B. When the boron coating is used solely for reducing the gamma response, the naturally occurring isotopic concentration of boron may be used. Naturally occurring boron consists of about 80% $^{11}$B and 20% $^{10}$B. The coating may also consist entirely of boron enriched in the $^{11}$B isotope. The boron coating reduces the number of electrons produced in the cathode from entering the active volume of the detector. The active volume of the detector is the volume between the anode and the cathode. The volume primarily starts and ends where the anode is exposed within the detector. Boron is employed for this purpose because of its low atomic number, which lowers the gamma production of electrons in the boron itself.

The total sensitivity of the detector may be varied by adjusting the $^3$He gas pressure and the $^{10}$B coating thickness. Sensitivity adjustments may be accomplished by two methods. The first is achieved by adjusting the amount of $^3$He within the detector volume which is measured by the filling pressure. An increase in pressure, or amount of $^3$He, increases sensitivity, and conversely a reduction in pressure reduces sensitivity. According to the second method, the $^{10}$B coating thickness is varied. Increasing the coating thickness increases detector sensitivity until the coating begins to shield the detector volume by excessive adsorption of neutrons. Excessive coating thicknesses prevent the reaction products from entering the gas volume and thus prevent the signal from being collected on the anode.

The insulators are typically fabricated from high purity alumina ceramics. The ceramics which are used for the seal assembly, item 6 in FIG. 1, have metal flanges brazed to them which are then brazed into one end of the detector. The electrical feed through in the center of the insulator is also brazed into place. The internal insulator, item 8 in FIG. 1, is held in place by mechanically capturing it on the end plate of the detector. The seal assembly and internal insulator may also be attached by using epoxy. Alternative materials for the insulators are plastics, TEFLON® (polytetrafluoroethylene), glass or other ceramic materials.

The anode is typically a piece of wire suspended between the insulators, typically tungsten wire. Other conductive materials may be used such as stainless steel, nickel or nickel alloys, copper, quartz and various other materials. The anode may be welded, crimped, tied or epoxied in place. The anode is attached to metal parts mounted on the seal and internal insulator.

The chamber is hermetically sealed using conventional techniques. The hermetic seal is typically accomplished by both welding and brazing the components together. In some instances the components are epoxied, or soldered together. The fill gas is introduced into the detector through a hollow metal fill tube which is sealed by cold welding.

Since neutrons are neutral particles, in order to be detected, they must be charged by reaction with the materials they encounter in the detector. The detection media utilized in the present detector are $^3$He gas and the thin boron coating. Both materials have been selected in view of their high capture cross-section for neutrons. The $^3$He gas and the boron coating are subjected to an electric field within the chamber and the neutrons present react with the materials in a way such that charged particles are produced which ionize the $^3$He gas. The resulting ions produce an electric signal in the form of output electronic pulses collected at the anode. The size of each pulse is proportional to the energy of the reaction of the neutron with the specific material. Thus, the detector of the invention is a neutron proportional counter. The $^3$He reaction produces an energy response up to 765 KeV. The $^{10}$B reaction produces a response up to 1470 KeV.

Figure 2:
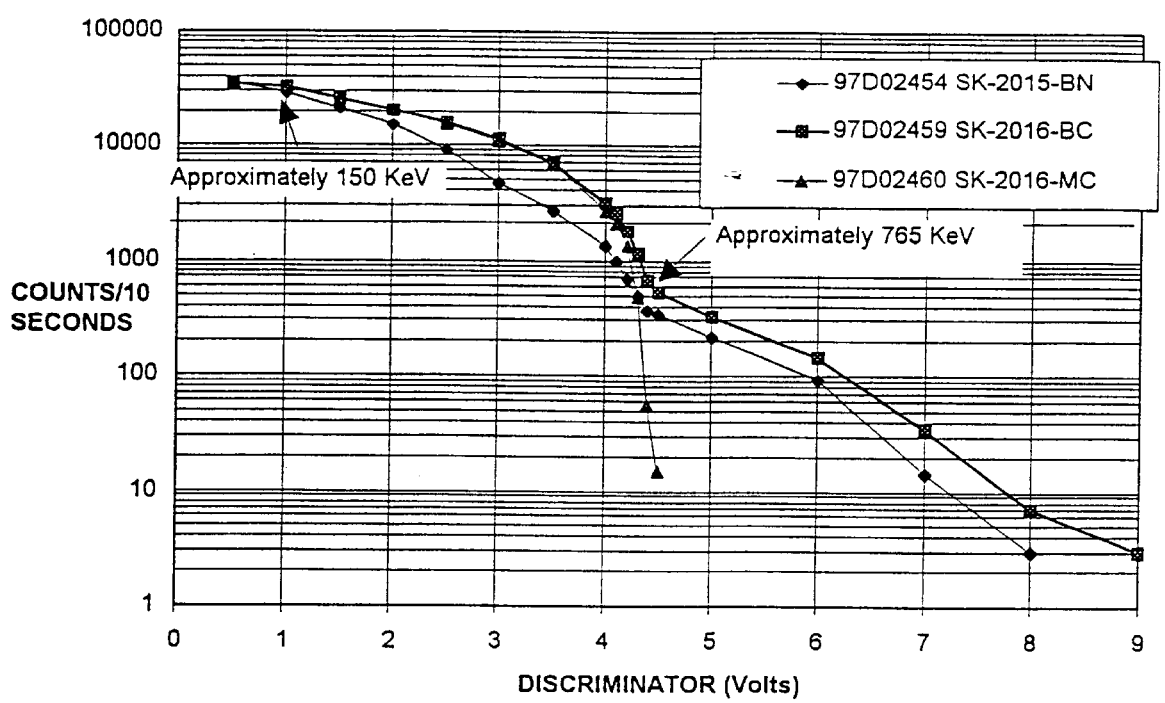
FIG. 2 shows integral bias curves for two detectors of the invention (SK-2015-BN and SK-2016-BC) and a conventional $^3$He filled neutron detector.

FIG. 2 shows an integral bias curve obtained by plotting counts per 10 seconds against discriminator (volts). Detectors SK-2015-BN and SK-2016-BC are examples of the invention and incorporate a $^{10}$B coating on the cathode. Detector SK-2016-MC is a conventional $^3$He filled detector without a $^{10}$B coating. This graph shows the counting rate versus the energies from the $^3$He and $^{10}$B response from the detectors. As can be seen in the curves at discriminator levels greater than 4.5 volts (765 KeV), there is still a neutron response for the detectors of the invention, and none for the conventional $^3$He detector. To achieve dual range advantages of the present detector, pulse height discrimination of the detector signal can be used. The dual range advantage can also be obtained by changing the tube operating bias. By electronically measuring the energies from above 150 KeV, the response from both the $^3$He gas and the $^{10}$B coating will be measured for maximum sensitivity applications. By electronically discriminating all energies below 765 KeV, the higher $^{10}$B reaction energies will be utilized for reduced sensitivity applications. This is shown in the integral bias curve of FIG. 2. For maximum sensitivity use the discriminator would be set at approximately 0.5 to 1.0 volts. For reduced sensitivity use the discriminator would be set at approximately 4.5 volts.

Table I below displays the total sensitivity and the sensitivity from $^{10}$B reactions greater than 765 KeV of 12 prototype detectors.

TABLE 1

SENSITIVITY DATA OF DETECTORS*

| PART NUMBER | SENS. Total #1 | $^{10}$B SENS. #1 | SERIAL # | SENS. Total #2 | $^{10}$B SENS. #2 | SERIAL # |
|---|---|---|---|---|---|---|
| SK2015-BN | 45.3 | 0.431 | 97D02454 | 45.5 | 0.441 | 97D02455 |
| SK2015-1BN | 47.1 | 0.387 | 97D02478 | 46.7 | 0.413 | 97D02479 |
| SK2015-2BN | 44.2 | 0.334 | 97D02466 | 44.0 | 0.353 | 97D02467 |
| SK2016-BC | 45.5 | 0.706 | 97D02458 | 44.9 | 0.680 | 97D02459 |
| SK2016-1BC | 47.0 | 0.602 | 97D02477 | 47.4 | 0.594 | 97D02476 |
| SK2016-2BC | 44.6 | 0.569 | 97D02471 | 44.4 | 0.602 | 97D02470 |

Figure 3:
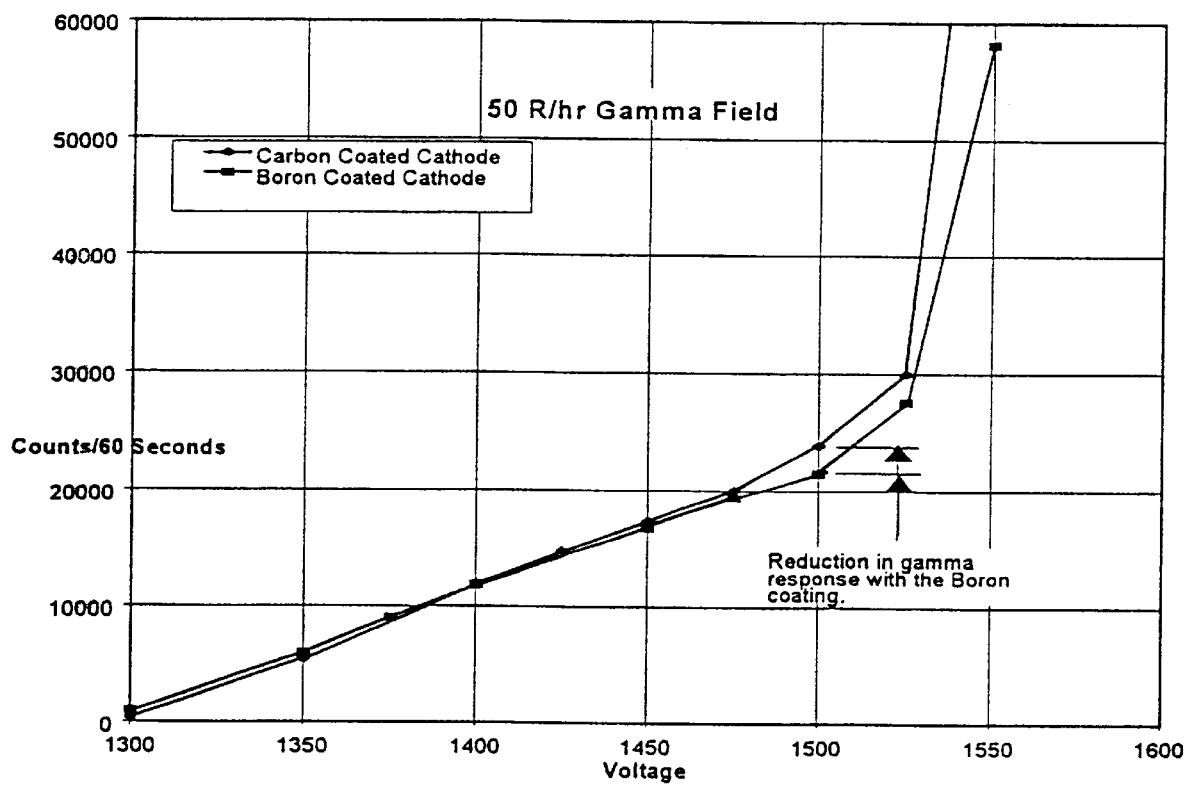
FIG. 3 shows detector response in a mixed neutron and gamma field.

*Sensitivity values are in units of counts/second/neutron/cm$^2$/second, as measured in an isotropic flux FIG. 3 shows detector response in a mixed neutron and gamma field. The detector which has only the typical carbon coating on the body shell shows elevated counts due to gamma response at 1500 volts. The detector with the boron coating shows no appreciable increase due to gamma response at 1500 volts. The reduction in count rate at the 1500 volt point can be seen due to the addition of the boron at the cathode.

Figure 4:
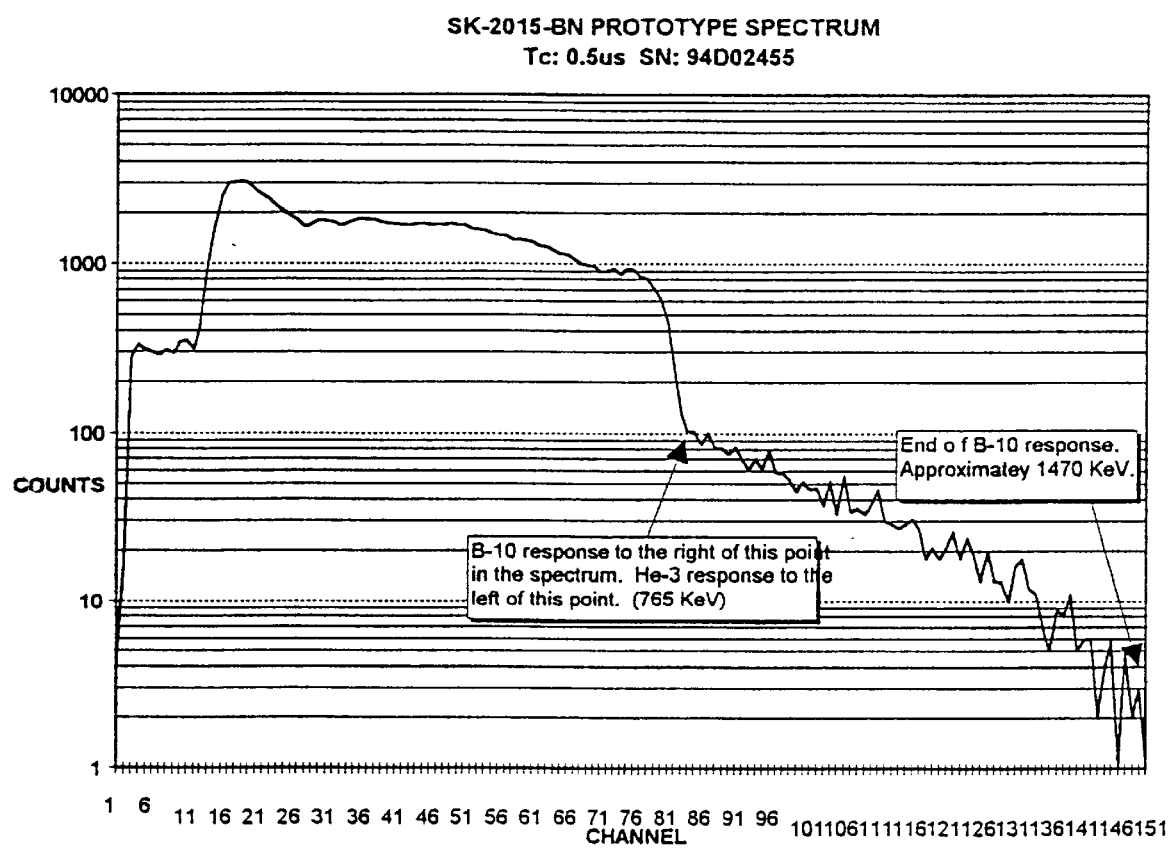
FIG. 4 shows a spectrum of the energy response of a detector of the invention.

FIG. 4 shows a spectrum of the energy response of the detector. Signals up to energy 765 KeV are due primarily to the $^3$He reaction. Signals greater than 765 KeV are due to the $^{10}$B reaction. Channel 85 and lower shows the response from the $^3$He and lower energy $^{10}$B reactions, less than 765 KeV. Above channel 85 shows the response from the $^{10}$B reactions up to 1470 KeV.

Figure 5A:
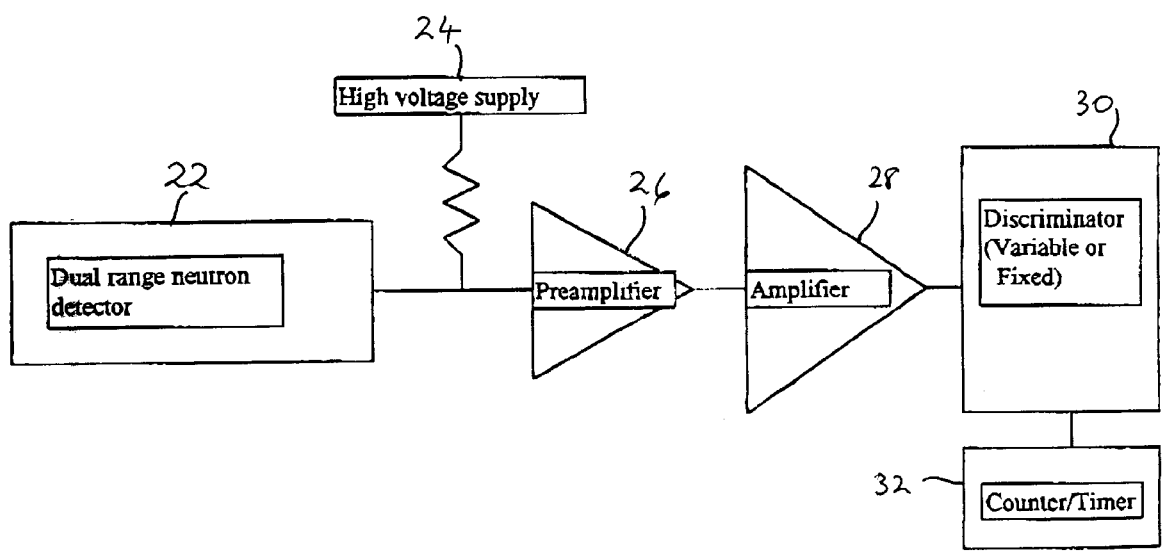
FIG. 5A shows a typical circuit used in operation of the device.
Figure 5B:
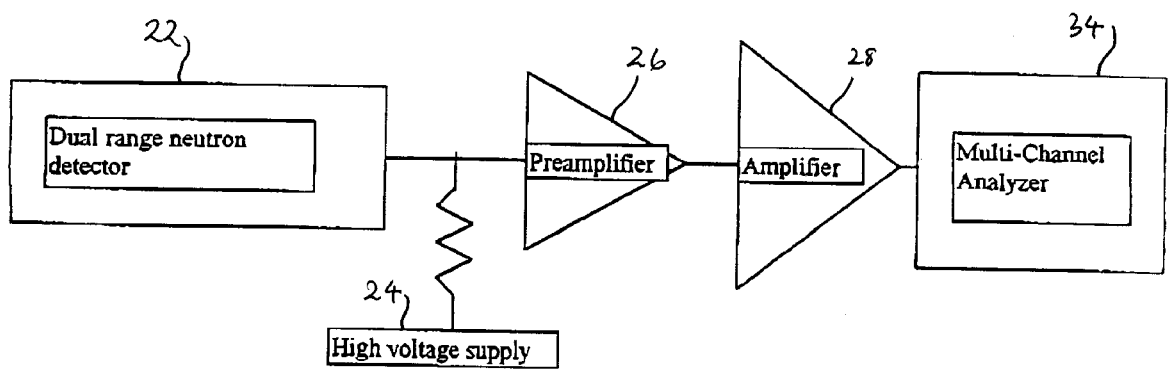
FIG. 5B shows a typical circuit employing a multi-channel analyzer.

FIGS. 5A and 5B show two typical circuit diagrams use in operation of the device. FIG. 5A depicts the system used to operate the detector with a fixed or variable discriminator and a fixed or variable high voltage supply. The detector 22 is connected via a high voltage supply 24 to a preamplifier 26 connected to an amplifier 28. The amplifier is connected to a discriminator 30 which may be variable or fixed. A counter 32 is connected to the discriminator. When a fixed discriminator is used the gamma discrimination is accomplished by decreasing the high voltage. When a fixed high voltage is used, the discriminator is varied to eliminate the gamma response.

FIG. 5B shows the circuit employing a multi-channel analyzer. This circuit is similar to that depicted in FIG. 5A except that the amplifier is connected a multi-channel analyzer 34 which looks at all pulses and generates a graph based on pulse heights. When this system is used, the gamma response is eliminated by only integrating the neutron signal which appears above the gamma signal.

Figures 6, 7:
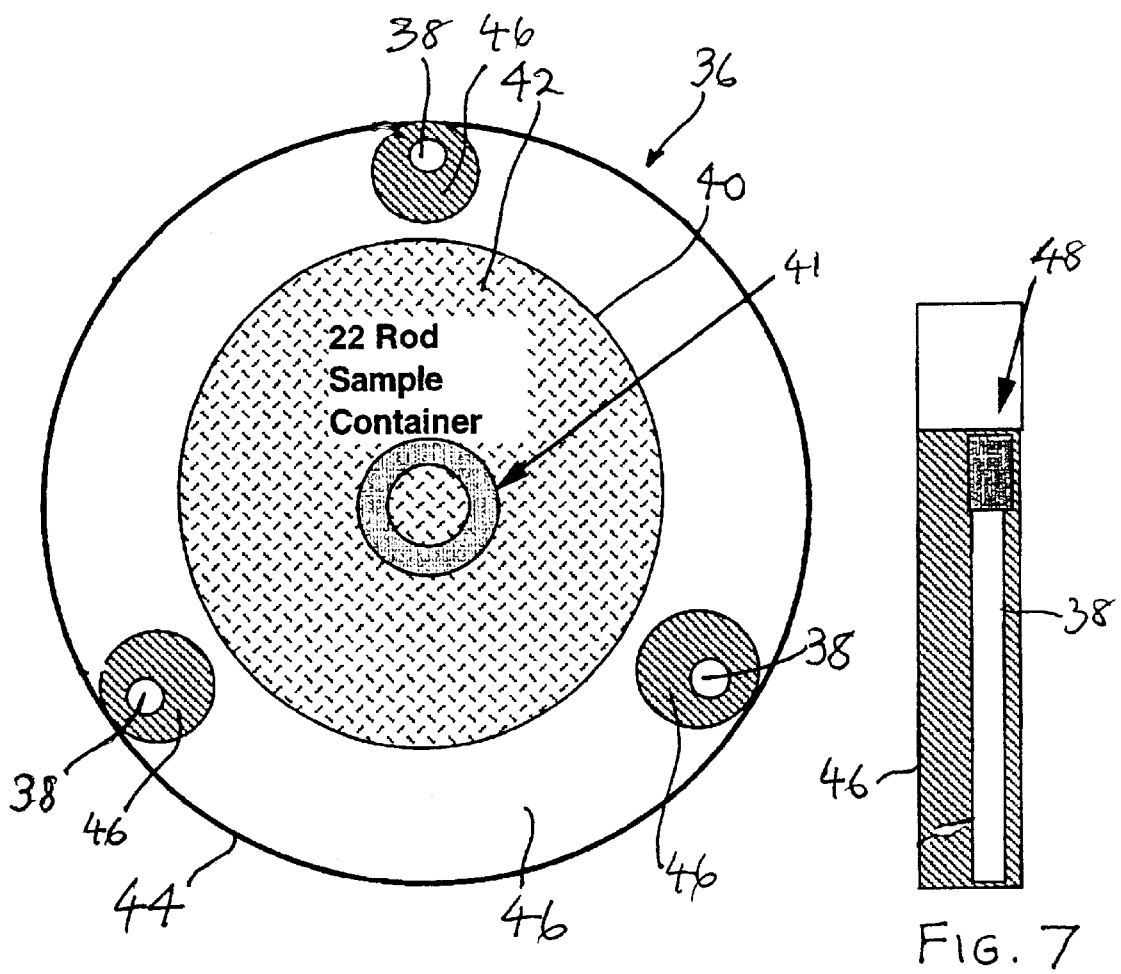
FIG. 6 is a schematic plan view showing an actual application of the invention for the Plutonium Canister Counter (PCC) used to measure spent nuclear fuel.
FIG. 7 is a sectional side-elevation of a dual range detector mounted in a lead sheath.

FIG. 6 shows an actual application of the invention for the Plutonium Canister Counter (PCC) used to measure spent nuclear fuel. This application is described in more detail in the Example below.

The device is used as follows. The detector measures thermal neutrons. If the neutrons emitted from the sample are not in the thermal energy range, the detector must be placed in a moderator, which is typically high density polyethylene. In the event the gamma field is excessive, additional shielding may be added between the detector and the sample. A single detector may be used or multiple detectors based upon the measurement efficiency required and the expected neutron activity of the sample. The higher the efficiency required, the more detectors are needed.

The sample to be measured is placed external to the detector or detector moderator assembly. The neutrons emitted from the sample are measured by the detector for a fixed period of time. The reactivity of the source can be established by the number of events (counts) measured by the detector for a fixed period of time.

When it is necessary to adjust the discriminator level with the electronics configuration displayed in FIG. 5A for use in high gamma fields or higher level neutron fluxes, three methods can be used: It is to be noted that a discriminator is an electronic cutoff point which allows pulses collected from the detector below a certain size to be eliminated from the measured signal. Pulses from the $^3$He reaction have a smaller height, or size, than the higher energy pulses from the $^{10}$B reaction products.

In the first of the three methods, the discriminator level can be left at a fixed level and the detector high voltage can be reduced which runs the detector signal at a reduced pulse height. This will reduce the gamma induced, or $^3$He reaction pulses to a height smaller than the preset discriminator, thus eliminating them from the collected signal.

According to the second method, the voltage can be left at a fixed value and the discriminator can be adjusted, raised, to eliminate the smaller gamma induced or $^3$He reaction pulses, eliminating them from the collected signal.

In the third approach, with a fixed voltage and discriminator the amplification from the amplifier can be reduced to reduce the pulse size. This will reduce the gamma induced or $^3$He reaction pulses to levels below the discriminator, eliminating them from the collected signal.

When the system incorporates the electronics displayed in FIG. 5B, the unwanted gamma induced or $^3$He reaction pulses can be eliminated from the measured signal by simply using the pulse height spectrum accumulated on the pulses height analyzer (multi-channel analyzer, MCA). The MCA acquires data by providing an energy spectrum which is generated through the pulse height of the reaction products. An example of a spectrum is seen in FIG. 4. By integrating or summing up the counts in the spectrum for a fixed period of time, the count rate can be determined. During data analysis, the summing of the counts for specific areas of the spectrum can be accomplished which allows elimination from the total, which permits discrimination between gamma induced or $^3$He reaction pulses.

By the present invention there is provided a device which utilizes a combination of neutron sensitive materials having difference levels of efficiency and energy responses to produce a dual range neutron detector. The use of the $^3$He reaction provides high sensitivity for low neutron fluxes and the use of the $^{10}$B reaction provides a low sensitivity for high neutron fluxes. The combined use of the two sensitive materials, namely a boron coating enriched in $^{10}$B in conjunction with the $^3$He gas, increases the detector efficiency and maintains neutron sensitivity in high level gamma fluxes. The device possesses a dual range capability by using the higher energy $^{10}$B pulses to operate at a reduced efficiency in a higher gamma flux or when a lower sensitivity is desired in a high neutron flux. The presence of the boron coating at the cathode reduces the number of gamma induced electrons generated from the cathode wall.

The device of the invention may be used for high level radiation waste monitoring, particularly where high levels of gamma radiation are present. Application to fuel storage pools where low to high level neutron fluxes are present is also possible. The device may be employed as a reactor start-up monitor, and may be utilized to allow extended neutron flux monitoring with a single detector. The detector is particularly useful in any application where vastly different levels of neutron and gamma radiation are present. Such instances occur in reactor research work, spent fuel monitoring, nuclear waste assay, and other nuclear safeguards applications. The detector of the invention has immediate applications for nuclear waste measurements in high gamma field applications.

EXAMPLE

The invention will now be described in more detail with respect to FIGS. 6 and 7. FIG. 6 depicts the use dual range $^3$He plus $^{10}$B tube devices for a detector known as a Plutonium Canister Counter (PCC), generally referenced 36. PCC 36 utilizes three dual range tubes 38 of the invention to surround a spent fuel canister 40 with a handle 41 containing 22 spent fuel rods 42. Each dual range tube is placed proximate to the spent fuel to facilitate measurement thereof. The term "proximate" as used in the context of the present invention means that the detector is located in relation to the sample as determined by overall system requirements to enable measurements to be taken. The system requirements will vary based upon the sample activity, and size. Standard practice would place the detector such that a minimum count rate of 0.005 counts per second per active inch of the detector is achieved and a maximum total count rate of less than $10^6$ counts per second is not exceeded.

The canister 40 is disposed in a well 44 and surrounded by water 46 to moderate or slow down neutrons emitted from the spent fuel rods 42. Each dual range detector 38 is mounted in a lead sheath 46 which is thicker in the direction of the spent fuel rods.

FIG. 7 shows a side cut-away view of a detector of the invention 38 within a lead sheath 46. The detector is connected to a PDT 150W preamplifier 48, as shown in the FIGS. 5A and 5B.

The gamma-ray dose at the detector tube position is high and in the range of 20 to 1000 R/h from the fission products in the spent fuel. The dual range capability using the $^{10}$B feature permits measurement of neutrons in the high gamma dose.

The foregoing description has been presented for the purpose of illustration. Variations and modifications of the disclosed invention will be readily apparent to practitioners skilled in the art.

We claim:

1. A dual range neutron detector, comprising:

a chamber having two ends and an inner wall, said chamber having two ends and an inner wall which serves as a cathode and being filled with $^3$He gas;

an insulator at each of said ends of said chamber;

an anode located within said chamber and supported by each of said insulators;

a boron coating on said inner wall of said chamber, said boron coating having a coating density in the range of from 0.01 mg/cm$^2$ to 1.0 mg/cm$^2$;

an electrical connector mounted on one of said insulators for transmission of a signal collected by said anode.

2. A device according to claim 1, wherein said $^3$He is present at a pressure of ranging from 0.1 atmosphere up to 20 atmospheres.

3. A device according to claim 1, wherein said boron coating contains the naturally occurring isotopic concentration of $^{10}$B.

4. A device according to claim 1 wherein said boron coating is enriched to about 92% of the 10B isotope.

5. A device according to claim 4, wherein said coating is enriched to about 20% of the $^{10}$B isotope.

6. A method of measuring neutron levels in nuclear fuel, comprising the steps of:

providing a dual range neutron detector proximate nuclear fuel to be measured, said detector comprising a chamber having two ends and an inner wall which serves as a cathode, said chamber having two ends and an inner wall and being filled with $^3$He gas, an insulator at each of said ends of said chamber, an anode located within said chamber and supported by each of said insulators, a boron coating on said inner wall of said chamber, said boron coating having a coating density in the range of from 0.01 mg/cm$^2$ to 1.0 mg/cm$^2$, an electrical connector mounted on one of said insulators for transmission of a signal collected by said anode;

detecting the neutron level in said fuel.

7. The method of claim 6 wherein said fuel is spent nuclear fuel.

* * * * *